455/12

United States Patent [19]

Edstrom

[11] 3,848,093

[45] Nov. 12, 1974

[54] APPARATUS AND METHOD FOR INCREASING THE TRANSMISSION CAPACITY OF A TIME DIVISION SYNCHRONOUS SATELLITE TELECOMMUNICATION SYSTEM

[75] Inventor: Nils Herbert Edstrom, Stockholm, Sweden

[73] Assignee: Telefonaktiebolaget L M Ericsson, Stockholm, Sweden

[22] Filed: Feb. 28, 1973

[21] Appl. No.: 336,402

[30] Foreign Application Priority Data

Mar. 22, 1972 Sweden .............................. 3661/72

[52] U.S. Cl. .............................. 179/15 AS, 325/4

[51] Int. Cl. .............................. H04j 5/00

[58] Field of Search ....... 325/4; 179/15 AQ, 15 AT, 179/15 AS

[56] References Cited

UNITED STATES PATENTS

| | | | |
|---|---|---|---|
| 3,644,678 | 2/1972 | Schmidt | 179/15 BA |
| 3,644,680 | 2/1972 | Amano et al. | 179/15 AS |
| 3,683,116 | 8/1972 | Dill | 179/15 AQ |
| 3,721,767 | 3/1973 | LaMarche et al. | 179/15 AS |

*Primary Examiner*—Kathleen H. Claffy
*Assistant Examiner*—Joseph A. Popek
*Attorney, Agent, or Firm*—Hane, Baxley & Spiecens

[57] ABSTRACT

The invention relates to a method and a device for increasing the transmission capacity of a time division synchronous satellite telecommunication system in which each ground station has a control processor which is arranged to assign continuously time slots out of a time slot pool to the ground stations in proportion to their varying demands for transmission capacity. According to the invention, it is possible to apply speech interpolation not only to such time slots that are constantly assigned to the ground stations and are transmitted via permanently assigned transmission channels but also to reassignable time slots of the pool, transmitted via temporarily assigned transmission channels.

2 Claims, 9 Drawing Figures

Figure 1:
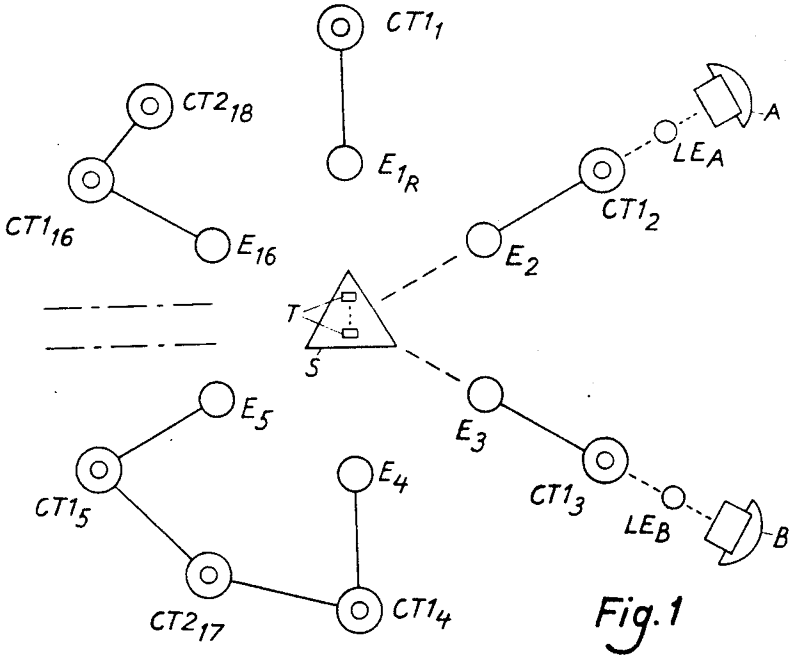

APPARATUS AND METHOD FOR INCREASING THE TRANSMISSION CAPACITY OF A TIME DIVISION SYNCHRONOUS SATELLITE TELECOMMUNICATION SYSTEM

The invention relates to a method for increasing the transmission capacity of a time division synchronous satellite telecommunication system in which a first number of time slots are available for telephony transmission between international transit centres. Connected to each of the transit centres is a first number of ground stations, each having a control processor. These control processors being in continuous connection with one another and arranged continuously to assign time slots from a subset of time slots of the first number of time slots between the ground stations in proportion to their varying demands for transmission capacity. The ground stations of a subset of the first number of ground stations have constantly assigned to them a subset of time slots of the first number of time slots. Each of the ground stations has in its respective transmission unit an equipment for the detection of temporary interruptions in such speech signals, arriving from the transit centres as have been assigned time slots out of the subset of time slots by the control processor in the respective ground stations. The ground stations also have means operative during such temporary interruptions of the speech signals, for interrupting their transmission and, instead, during their associated assigned time slots, transmitting such speech signals arriving from the transit centres as are waiting to be assigned time slots.

The publication INTELSAT/IEE conference on Digital Satellite Communication No. 59, 1969, describes time division synchronous satellite telecommunication systems in which each ground station has a control processor, these control processors being arranged continuously to assign a group of commonly utilized time slots between the ground stations in proportion to their varying demands for transmission capacity. The object of this socalled DA technique, DA being an abbreviation for demand assignment, is to achieve an effective utilization of the limited number of transmission channels of the synchronous satellite for transmission of the time slots, so as to exploit, for example, the variations in the traffic intensity between the ground stations which are due to differences in local time.

The publication describes also, in particular on pages 86–87, 449–450 and 532–540, applications in synchronous satellite telecommunication systems of a known technique as TASI, an abbreviation for Time Assignment Speech Interpolation, which has been known for a comparatively long time, and, in telephony transmission, has permitted effective utilization of the available number of transmission channels in submarine cables. The basic idea of this technique is to connect a subscriber to a transmission channel only during the period when he is speaking and to release the transmission channel during momentary interruptions of his speech signal in order thereby to be able to transmit the speech signal of another subscriber on the same transmission channel. The transmission capacity obtained with TASI increases first quickly and thereafter more slowly with the number of transmission channels available. With, for example, 60 transmission channels a doubling of the transmission capacity can be counted on, which implies that altogether 120 instead of normally 60 subscribers can be served in parallel.

Briefly the DA and TASI techniques, used independently in a synchronous satellite telecommunication system, permit an increased transmission capacity by making more effective use of the limited number of transmission channels of the synchronous satellite. The simultaneous use of the DA and TASI techniques in order to obtain a maximal degree of utilization of the transmission channels, however, is prevented by the fact that, on continuous assignment and reassignment of the time slots and their associated transmission channels between the ground stations, there will be a number of transmission channels, varying in time, available for release and use by a TASI-connected subscriber, which means that irregular clipping of the subscriber's speech may occur. This clipping may be seriously troublesome in the event of imperfections in the coordination between the control processors of the ground stations, which coordination is complicated by the prolonged transmission time between the ground stations, more than a quarter of a second, and in actual fact the control problem is of such difficulty that it has not hitherto been solved.

This control problem is solved according to the invention in the manner as defined in the appended claims.

Figure 2:
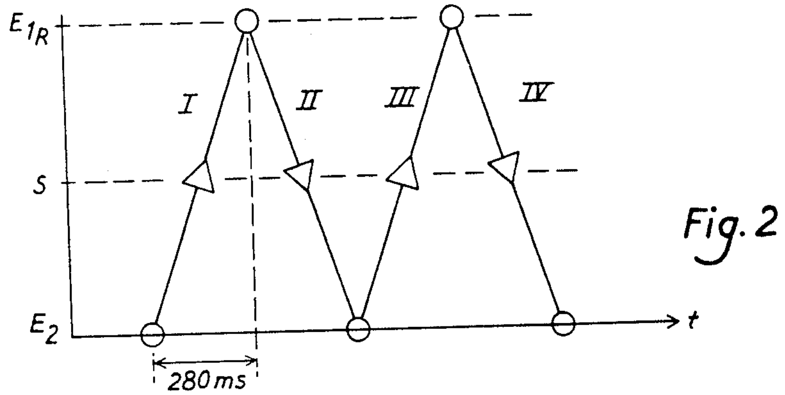
Figure 3:
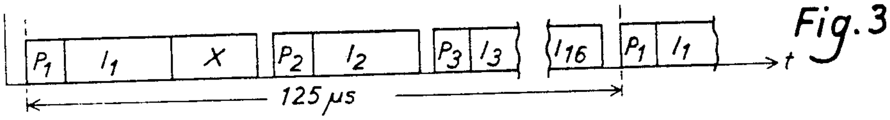
Figure 4:
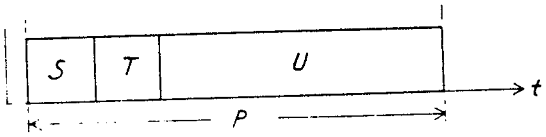
Figure 5:
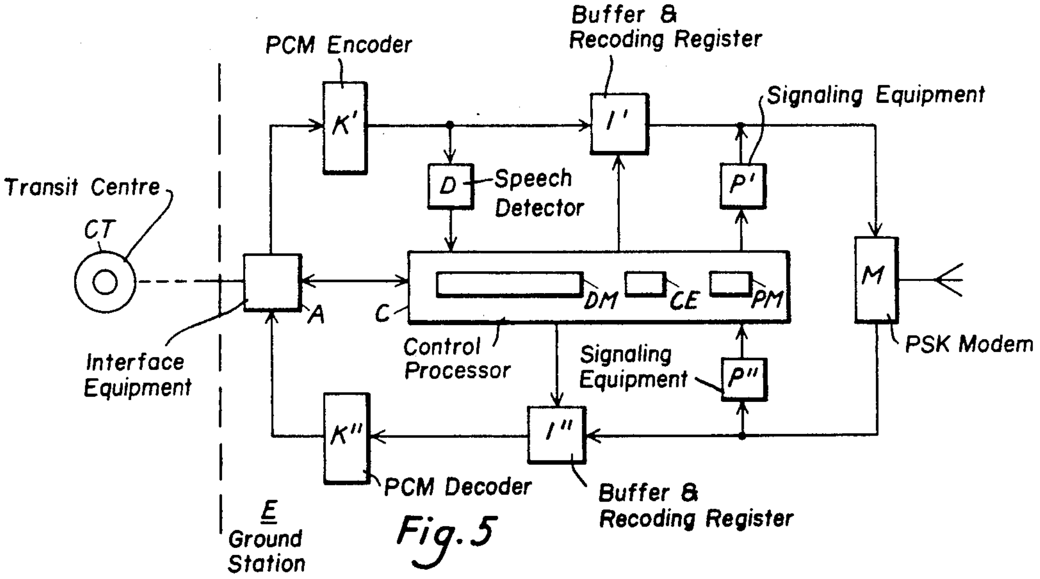
Figure 7:
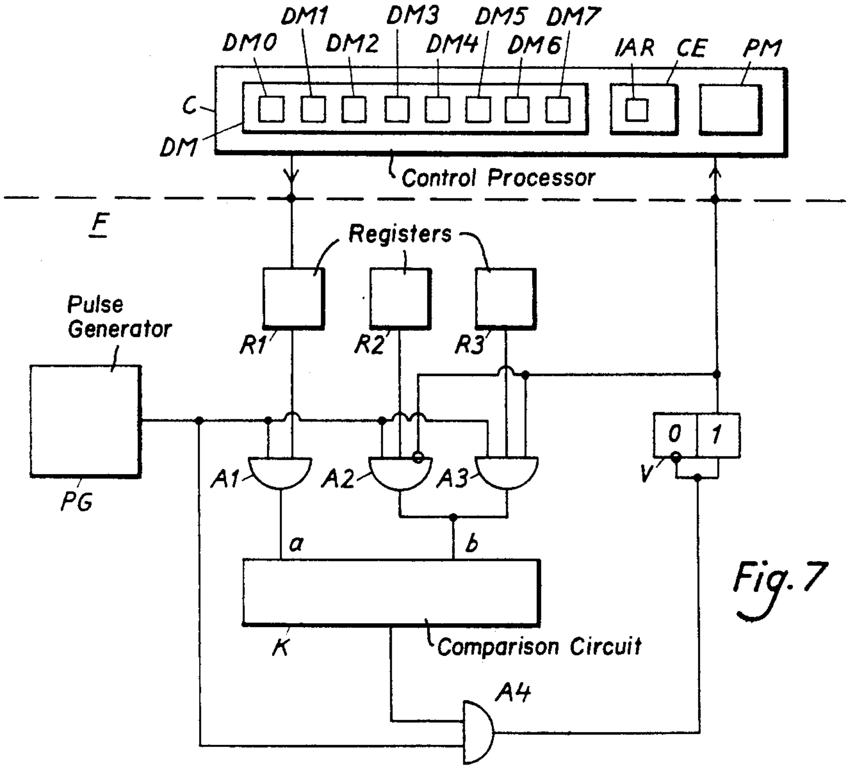
Figure 6:
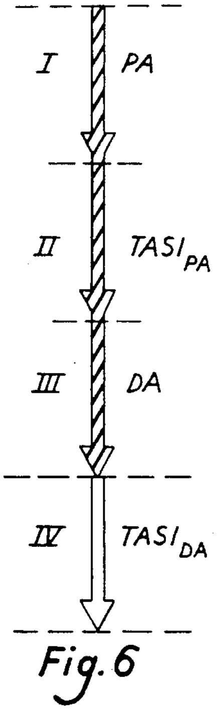
Figure 8:
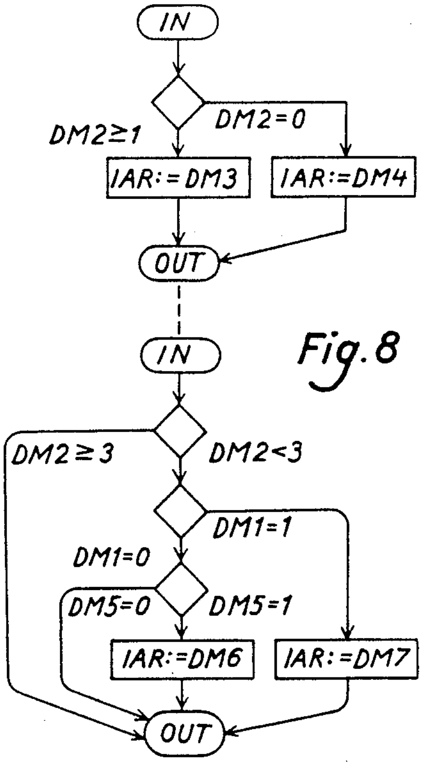
Figure 9:
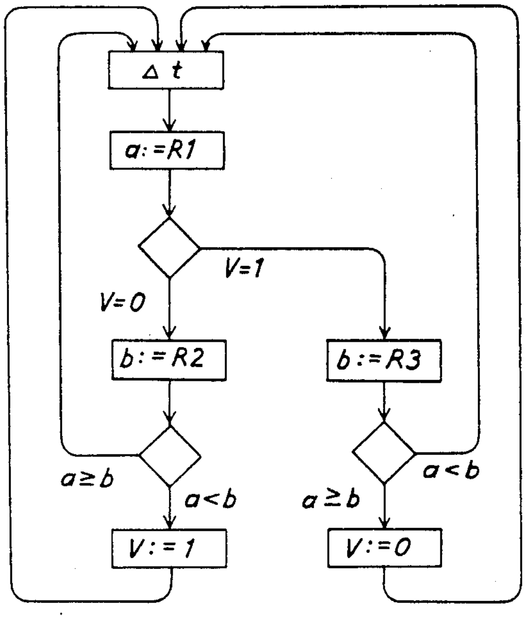

The invention will now be described with reference to the accompanying drawing, where FIG. 1 shows the transmission paths in a traffic network for a synchronous satellite telecommunication system with a number of geographically spread ground stations, FIG. 2 shows a signalling scheme used for temporary increase of the transmission capacity of one of the ground stations in FIG. 1, FIG. 3 shows a time diagram of the signalling and speech information transmission in the system in FIG. 1, FIG. 4 shows a more detailed time diagram of the signal transmission according to FIG. 3, FIG. 5 shows a block diagram of the internal structure of the ground stations in FIG. 1, FIG. 6 illustrates in a line diagram the maximal transmission capacity of the respective ground stations in FIG. 1 as a sum of four subquantities, of which the fourth subquantity is achieved by means of the method according to the invention, FIG. 7 shows a logic diagram of the preferred device for implementation of the method according to the invention and the connection of this device to a central control processor shown in FIG. 5, FIG. 8 shows in the form of a flow chart a working program through which, according to the invention, the central control processor in FIG. 5 at the respective ground station in FIG. 1 will run for every setting up of a connection, and FIG. 9 shows a flow chart of the function of the preferred device shown in FIG. 7 for implementation of the method according to the invention.

FIG. 1 shows the transmission paths in a traffic network for a synchronous satellite telecommunication system comprising a satellite S having, according to the example, eight transponders T via which 4-wire transmission can take place between sixteen international transit centres of class $CT1_{1-16}$ according to CCITT's classification through sixteen ground stations $E_{1-16}$. FIG. 1 also shows an example of how two international ground stations of class $CT2_{17}$ and $CT2_{18}$ according to CCITT's classification can be arranged in the telecommunication system. Dotted lines indicate the transmission path between a subscriber A who, via a local exchange $LE_A$, is connected to the transit centre $CT1_2$ and a subscriber B who, via a local exchange $LE_B$, is connected to transit centre $CT1_3$.

The telecommunication system in FIG. 1 is a time division PCM transmission system and at each ground station $E_{1-16}$ there is a central control processor. For utilization of the limited number of transmission channels of the transponder T of the synchronous satellite S as effectively as possible, the said control processors of the ground stations $E_{1-16}$ are arranged to be in continuous connection with one another on a common signalling channel in order continuously to assign time slots out of a time slot pool between the ground stations $E_{1-16}$ in proportion to their varying demand for transmission capacity.

Assignment of the time slots out of the time slot pool between the ground stations $E_{1-16}$ in balanced proportion to their respective demands for transmission capacity requires a coordinating control which in principle may be achieved by any of the control processors of the ground stations $E_{1-16}$. According to the example the coordinating control is achieved through the fact that the control processor of ground station $E_1$ is used as reference processor, which condition is indicated in FIG. 1 through the fact that the complete designation of the ground station $E_1$ in that figure is $E_{1R}$.

FIG. 2 shows a signalling scheme used for accessing time slots out of the time slot pool. On setting up a connection, for example from subscriber A to subscriber B, it is assumed that the control processor at ground station $E_2$, which is connected to subscriber A via the local exchange $LE_A$, finds that its transmission capacity is not sufficient and the traffic intensity is increasing. The control processor at ground station $E_2$ then sends, in a first signalling step I, a demand for time slots from the pool to the reference processor at ground station $E_{1R}$. The reference processor answers in a second signalling step II by requesting information concerning the momentary number of subscribers connected and waiting for a connection at ground station $E_2$. The latter's control processor sends in a third signalling step III the requested information, whereupon the reference processor, which continuously notes every connection set up and cleared via the transponders T of the satellite S between the ground stations $E_{1-16}$, is in possession of sufficient information to assign time slots from the pool to ground station $E_2$, taking into account the demand for transmission capacity of all ground stations $E_{1-16}$.

In a fourth and last signalling step IV the reference processor sends a command to all ground stations $E_{1-16}$ that a new frame of time slots is to be set up, in which the ground station $E_2$ will have a larger number of time slots than before. This new command is received and executed by the control processors at ground stations $E_{1-16}$ by moving the time slots one bit position at a time until the new frame has been attained. This procedure may be calculated to take altogether slightly more than 3 seconds, including the signalling time, which amounts to 4 × 280 milliseconds. But, according to experience with the traffic models tested hitherto, it may be considered likely that a demand for time slots from the pool need not occur with a greater frequency than once a minute.

FIG. 3 shows a time diagram of the signalling and speech information transmission in the telecommunication system in FIG. 1. Within a PCM frame of 125 μs according to the example, the ground station $E_1$ first sends a signalling block $P_1$ and a speech information block $I_1$ and finally a block X consisting precisely of the earlier mentioned time slot pool. Ground station $E_2$ then sends a signalling block $P_2$ and a speech information block $I_2$ etc. until the frame is terminated by speech information block $I_{16}$ of ground station $E_{16}$. All signalling blocks $P_{1-16}$ have the same length of time, whereas the speech information blocks $I_{1-16}$ are varied according to the demands of the ground stations $E_{1-16}$ for transmission capacity. A given number of time slots in the information blocks $I_{1-16}$, however, is assumed to be preassigned to the respective ground stations $E_{1-16}$ which, for transmission of these time slots, in the following called PA time slots, PA being an abbreviation for preassigned, make use of preassigned transmission channels of the responders T of satellite S. The remaining time slots in the information blocks $I_{1-16}$ are assumed to be accessed by the respective ground stations $I_{1-16}$ out of the the pool by borrowing from block X, and in the following they will be called DA time slots, DA being an abbreviation for demand assignment. The total number of PA and DA time slots in the frame for the speech information transmission is, according to the example, 2000.

FIG. 4 shows a more detailed time diagram of the content of signalling block P in FIG. 3, consisting of a PCM synchronization word S, an identification word T for the transmitting ground station, and a signalling word U. By means of the signalling word U the setting up and clearing of connections between the ground stations $E_{1-16}$ via the transponders T of the satellite S are achieved in such a way that, for example, transit centres $CT1_2$ and $CT1_3$ in FIG. 1 are interconnected, after which all signalling between them in conjunction, for example, with setting up and clearing of a connection between subscribers A and B can take place as for a conventional ground connection. The signalling word U is also used to access time slots from the pool block X in FIG. 3 according to the signalling scheme shown in FIG. 2 and to transmit any other necessary coordinating control information between the control processors of the ground stations $E_{1-16}$ in the telecommunication system in FIG. 1.

In view of the importance of transmission of the signalling word U in undistorted form, it is transmitted with redundant coding to permit detection and correction of an eventual error. According to the example a cyclical Bose-Chaudhuri-Hocquenghem code is used, which is usually abbreviated BCH code. Correction of a signalling word U for which error detection has taken place is achieved either by self-correction at the receiving ground station, which facility is offered by the BCH code for a limited number of errors, or by retransmission from the transmitting ground station after a command to this effect has been signalled from the receiving ground station.

FIG. 5 shows a block schematic of the general structure of the ground station E in FIG. 1. Its connection to a transit centre CT in FIG. 1 is indicated by a dotted line. It is assumed in this case to be four-wire and of the analogue type within the voice-frequency band 0.3–3.4 kHz. Outgoing speech signals from connected subscribers at the transit centre CT are taken via an interface equipment A to a PCM encoder K', where an analogue to digital conversion takes place with 256 quantization levels and with a sampling frequency of 8 KHz. The outlet of the encoder K' is connected via a buffer-and recoding register I′ to the inlet of a phase-shift-keyed modem M, to which inlet the outlet of a signalling equipment P′ is also connected.

A control processor C activates the signalling equipment P′ and the buffer-and- recoding register I′ in order to generate a signalling block P and an information block I, respectively, according to FIG. 3 within a time interval within the frame associated with the ground station E. The same control processor C reads the content of each signalling block P received by the modem M by means of a signalling equipment P″ and, when the signalling word U of the signalling block P indicates as receiver the ground station E associated with the control processor C, transfers the information block I following after the signalling block P via a buffer-and-recoding register I″ to a PCM decoder K″, where a digital-to-analogue conversion is effected of the information block I for forwarding via the interface equipment A as incoming speech signals to the connected subscribers at transit centre CT.

A more detailed description of the control processor C, which is of known construction and comprises a central processing unit CE, a data memory DM and a program memory PM, is given for example in "LM Ericsson, Data processing System for Telecommunications, System APZ 130". .

At the respective ground stations $E_{1-16}$ two time slots are normally required for each connected subscriber, since connection to the transit centres $CT1_{1-16}$ is on a four-wire basis. By application of a TASI technique, TASI being an abbreviation for Time Assignment Speech Interpolation, however, the transmission capacity can be doubled so that, on an average, only one time slot is required for every connected subscriber. The outgoing speech signal of the subscriber is transmitted during an assigned time slot only during the time when he is speaking, while every interruption of speech causes the time slot to be released so that the outgoing speech signal from another subscriber can be transmitted during the time slot. The detection of interruptions in the outgoing speech signals from connected subscribers is achieved in the block schematic in FIG. 5 by means of a digital speech detector D connected to the outlet of the PCM encoder K′. The outlet of the speech detector is connected to the control processor C which, depending on whether the output signal from the speech detector D indicates that the connected subscribers are speaking or are not speaking, permits and blocks, respectively, read-in to the buffer-and-recoding register I′ and thereafter informs the signalling equipment P′ which of the connected subscribers has had his speech signals read into the register I′. This information is later sent from the signalling equipment P′ within the earlier mentioned signalling word U of the signalling block P.

Since the reaction time of the speech detector D is not instantaneous but, according to the example, takes about 5 ms, the inlet of the buffer-and-recoding register I′ is furnished with a delay circuit not shown in the figure. Furthermore the speech detector D is so designed as to indicate interruptions in a subscriber's speech only after the interruption has lasted about 200 ms, so that frequent interruptions of briefer length in a subscriber's speech do not cause the outgoing speech signals from the subscriber to be blocked from read-in to register I′ and thus unnecessarily clipped.

As earlier mentioned, the information blocks $I_{1-16}$ of the ground stations $E_{1-16}$ contain both PA time slots and DA time slots. The maximal transmission capacity of the respective ground stations $E_{1-16}$ can be illustrated, as in FIG. 6, as a sum of four subquantities I-IV, of which the first subquantity I indicates the transmission capacity of the PA time slots per se, the second subquantity II indicates an increment in the transmission capacity corresponding to the application of TASI to the PA time slot, the third subquantity III indicates the transmission capacity of the DA time slots per se, and the fourth subquantity IV indicates an increase in the transmission capacity corresponding to the application of TASI also to the DA time slot.

At the present state of the art the maximal transmission capacity of the ground stations $E_{1-16}$ is limited to correspond to the sum of the subquantities I, II and III in FIG. 6. The reason is that, whereas TASI can without hindrance be applied to the PA time slots since the latter are transmitted via transmission channels in the transponders T of the satellite S which are permanently assigned to the ground stations $E_{1-16}$, the application of TASI to the DA time slots is prevented by the fact that, since they are to be reassignable between the ground stations $E_{1-16}$, they must be transmitted via temporarily assigned transmission channels which at any time can be changed as a result of signalling having taken place as shown in FIG. 2. The application of TASI to the DA time slots thus constitutes a difficult control problem for which no solution has hitherto been found.

The method according to the invention is based on the realization that, when the time slot pool in block X in FIG. 3 is temporarily empty during a traffic peak, the signalling according to FIG. 2 will no longer have any function to fulfil. Since, according to experience with all traffic models tested hitherto, this signal would not need to come into use with a greater frequency than at most once a minute, as earlier mentioned in connection with FIG. 2, it would consequently be possible, immediately after the emptying of the time slot pool block X, to fix or freeze the actual frame during a predetermined time of, for example, precisely one minute without this measure in itself appreciably affecting the transmission capacity of the ground stations $E_{1-16}$ as indicated by the sum of the subquantitities I, II and III in FIG. 6. Through the freezing of the frame, however, all DA time slots, like the PA time slots, will according to the basic idea of the invention be associated with predetermined transmission channels in the transponders T of the satellite S, which implies that during a specific time of, according to the example, 1 minute TASI can be applied without complication from the control point of view to all time slots within the information blocks $I_{1-16}$ of the ground stations $E_{1-16}$, whereby their transmission capacity will be increased to correspond to the sum of all four subquantities I–IV in FIG. 6.

A prolongation of the duration of this state can according to the invention be achieved by introducing a hysteresis condition under which freezing of the frame takes place, in accordance with what has been stated previously, when the time slot pool block has been entirely emptied, whereas return from the frozen state is achieved only when a given minimum number of time slots are free for transfer to the pool block X.

FIG. 7 shows a logic diagram of a device F connected to the control processor C shown in FIG. 5 for implementation of the method according to the invention.

The device F comprises a register R1 which, by means of the central processing unit CE of the control processor C, is fed from a continuously updated memory field DMO in the data memory DM of the control processor C with information on the number of free DA time slots in the frame in FIG. 3, including the time slots which are collected within the pool block X. On the basis of this information the device F establishes, by means of the procedure which will be described below, whether a normal state for the transmission within the telecommunication system in FIG. 1 shall prevail, in which normal state the ground stations $E_{1-16}$ can, in the event of a demand for extra transmission capacity, access DA time slots by signalling in accordance with FIG. 2 or, if instead a locked or frozen state is to prevail in which the frame in FIG. 3 is fixed during a given time, by inhibiting such signalling for accessing of DA time slots. The information on which state shall prevail is read out through the intermediation of the central processing unit CE of the control processor C from a flip-flop V in the device F to a memory field DM1 of the data memory DM, a binary zero on the output of flip-flop V corresponding to the normal state whereas a binary one corresponds to said frozen state.

In FIG. 1 the ground station $E_{1R}$ contains a reference processor of the telecommunication system referred to earlier in conjunction with the description of FIG. 2. In principle it suffices to equip solely the reference processor with the device F for implementation of the method according to the invention, but as it is a requirement that any of the control processors C of the ground stations $E_{1-16}$ must be selectable as reference processor, and that a change of the location of the reference processor may also be required in the event, for example, of a technical fault in the ground station $E_{1R}$, it is reasonable to equip all control processors C of the ground stations $E_{1-16}$ with device F.

FIG. 8 shows in the form of a flow chart a working program through which the central processing unit CE of the control processor C at the ground station E in FIG. 5 will run according to the invention for every connection set up between two subscribers, for example subscribers A and B in FIG. 1. In a first phase the central processing unit CE examines in the data memory DM the content of a memory field $DM_2$, in which is stored a continuously updated instruction concerning the number of free time slots of type PA or DA associated with its ground station E, and establishes whether there is at least one free time slot. In such case the central processing unit CE reads out from a memory field DM3 of the data memory DM to an instruction address register IAR associated with the central processing unit CE a start address stored in the memory field DM3 for a program in the program memory PM for assignment of a free time slot to the outgoing speech signal of the calling subscriber. If for the moment there is no free time slot, which is indicated by the fact that the content of the memory field DM2 is zero, the central processing unit CE reads out from a memory field DM4 of the data memory DM to the start address register IAR a start address stored in the memory field DM4 to a program in the program memory PM for transmission of the outgoing speech signal of the calling subscriber through use of TASI.

The central processing unit CE thereafter continues to examine the content of the memory field DM2 with respect to whether the number of free PA and DA time slots belonging to its ground station E is below a specific minimum number, according to the example three. If this happens to be so, the central unit CE examines the content of the memory field DM1 in the data memory DM in order to decide whether a normal state or frozen state prevails. If the content of the memory field DM1 is a binary zero and thus a normal state prevails, the central processing unit continues to examine the content of a memory field DM5 of the data memory DM, in which a binary one indicates that the traffic intensity is growing whereas a binary zero indicates that the traffic intensity is mainly constant or diminishing. If the content of the memory field DM5 is a binary one, the central processing unit CE reads out from a memory field DM6 of the data memory DM to the start address register IAR a start address stored in the memory field DM6 to a program in the program memory PM for DA signalling according to FIG. 2.

In the event that the content of the memory field DM1 is a binary one, in which case accordingly a frozen state prevails, the central processing unit CE reads out from a memory field DM7 in the data memory DM to the start address register IAR a start address stored in the memory field DM7 to a program in the program memory PM for transmission of the outgoing speech signal from the calling subscriber by application of TASI also to the DA time slots.

The function of the device F according to the invention will now be described in greater detail with reference to the logic diagram in FIG. 7 and to the flow chart in FIG. 9. In accordance with what has been stated earlier with reference to FIG. 6, it is assumed that the frozen state indicated by a binary one on the output of the flip-flop V will have a minimum duration of 1 minute. It is also assumed that the frozen state is achieved when the number stored in the register R1, which corresponds to the number of free DA time slots in the frame in FIG. 3, has the value zero, and that a return to normal state indicated by a binary zero on the output of the flip-flop V is brought about only when the number stored in the register R1 has the value three, this number of free time slots then being at hand to be transferred to the pool block X in a new frame.

The change between normal state and frozen state is brought about in the device F according to the invention through the fact that the contents of the register R1 is compared by a comparator K, in dependence on the binary value of the output of the flip-flop V, either with the number one stored in a register R2 or with the number three stored in a register R3. The desired minimum duration of one minute is obtained for the frozen state by controlling AND gates A1–4 connected to the input and output terminals of the comparator K by means of a continuous pulse train, the period of which is 1 minute, generated by the pulse generator PG.

The AND gate A1 connects the register R1 to a first inlet *a* of the comparator K, whereas the AND gates A2 and A3 connect the registers R2 and R3, respectively, to a second inlet *b* of the comparator K. The two latter AND gates A2 and A3 are controlled both by the pulse generator PG and by the flip-flop V, a binary zero on the output of flip-flop V opening the AND gate A2 through an inverting input of the latter and blocking the AND gate A3. On a binary one on the output of flip-flop V the reverse takes place.

On comparison by the comparator K of the numbers transferred to its inputs *a* and *b* the rule is, that, if *a* is smaller than $b$, a binary one appears on the output of comparator K, otherwise a binary zero. The output of comparator K is connected to flip-flop V, via the AND gate A4 connected to the pulse generator PG, in such a way that the binary value on the output of the comparator K is transferred to the output of flip-flop V on appearance of a pulse on the output of the pulse generator PG.

On changing from normal to frozen state the process is as follows. It is assumed that the number stored in the memory field DM0 of the data memory DM with information concerning the number of free DA time slots in the frame in FIG. 3 has just obtained the value zero and that this value has been transmitted to the register R1 by the central processing unit CE of the control processor C. On the next pulse from the pulse generator PG the AND gate A1 is then opened so that the contents of the register R1 is transferred to the input $a$ of comparator K. The binary zero existing in normal state on the output of flip-flop V opens the AND gate A2 and blocks the AND gate A3, the result being that the contents of the register R2 is transferred to input $b$ of the comparator K. The contents of register R2, however, is the number one, which is larger than the number zero in the register R1. Consequently the number on input $a$ is less than the number on input $b$ and a binary one will be generated on the output of comparator K and transferred via the AND gate A4 to the output of flip-flop V. This results in blocking of the AND gate A2 and opening of the AND gate A3. The binary value of the output of comparator K, however, is not changed thereby, since the number on input $a$ is still less than the number on input $b$, the latter only having been raised from one to three.

When the pulse from the pulse generator PG ceases, the binary one read out from comparator K is retained on the output of flip-flop V until one minute has passed and the next pulse appears on the output of pulse generator PG. During this minute the frozen state prevails, the updating of which to the memory field DM1 of the data memory DM is effected in the control processor C by its central processing unit CE. It may now be assumed that at the end of the minute the memory field DM0 of the data memory DM, which is constantly updated with information concerning the number of free DA time slots in the frame in FIG. 3, contains for example the number four and that this number has been read by the central processing unit CE of the control computer C into the register R1 in the device according to the invention. When the pulse from the pulse generator PG now appears, the operation is as follows.

The contents of register R1 is transferred via the AND gate A1 to the input $a$ of the comparator K. The binary one prevailing in frozen state on the output of flip-flop V blocks the AND gate A2 and opens the AND gate A3, so that now it is the contents of the register R3 which is transferred to the input $b$ of the comparator K. Since the contents of register R3 is the number three, which is less than the number four in register R1, the number on input $a$ is greater than the number on input $b$ and a binary zero will accordingly be generated on the output of comparator K and transferred via the AND gate A4 to the output of flip-flop V. The AND gate A2 will thus be opened and the AND gate A3 blocked, which condition however does not affect the binary value on the output of comparator K since the number on input $a$ still is greater than the number on input $b$, as the latter has been lowered from three to one.

The binary zero on the output of flip-flop V is now retained after the pulse from the pulse generator PG has ceased and, via the central processing unit CE of the control processor, updating will take place to the memory field DM1 of the data memory DM showing that normal state must now prevail.

This device described for implementation of the method according to the invention can, of course, be modified and further developed in many ways without departing from the basic concept of the invention. For example the numbers stored in registers R2 and R3 can be varied by intervention of the central processing unit CE in such a way that, if the traffic intensity shows comparatively brief peaks, the numbers are temporarily raised with a mutually retained difference. The advantage of this is that TASI can be more effectively utilized and that unnecessary DA signalling according to FIG. 2 is prevented.

Since an effective utilization of the DA technique assumes that the DA signalling takes place principally at the peaks of traffic intensity determined by the daily rhythm of the local traffic and not by randomly occurring brief traffic peaks, and with the knowledge that a typical local traffic peak determined by the daily rhythm in a telecommunication system according to FIG. 1 lasts several minutes, it is obvious that the minimum duration of one minute selected according to the example for the frozen state indicated by the invention for frames of the synchronous satellite transmission can be considerably increased. For a minimum duration of five minutes, for example, instead of one minute for the frozen state, this state may still in accordance with the principle of the invention be prolonged several times in succession at the greatest traffic peaks during a 24-hour period.

I claim:

1. In a time division synchronous satellite telecommunication system having a satellite transponder, a plurality ~~interruptions~~ of ground stations, a plurality of international transit centers each connected to one of the ground stations, speech signal communication between international transit centers taking place during time slots allocated from a plurality of time slots, each of the ground stations having a control processor, all of the control processors being in continuous connection with each other and continuously assigning time slots from a first subset of the plurality of time slots to at least some of the ground stations in response to their varying demands for transmission capacity and for assigning to each of the ground stations a fixed number of time slots from a second subset of the plurality of time slots regardless of the demands for transmission capacity, each of the ground stations of a subset of the ground stations having transmission apparatus which includes means for detecting temporary interruptions in the receipt of speech signals from its associated international transit center which is assigned a time slot from the second subset and, during such temporary interrutions, transmitting during the related time slots such speech signals from its associated international transit center which are waiting for transmission service, the method of increasing the transmission capacity of such a system comprising the steps of periodically determining in at least one of the ground stations the number of time slots from the first subset available for assignment, when the number is less than a first value initiating a frozen state of the system wherein the continuous assignment of time slots is interrupted and the ground stations of the subset of ground stations upon temporary interruptions in the receipt of speech signals from their associated international transit centers transmit during the associated time slots from the first as well as from the second subset such speech signals from their associated international transit centers which are waiting for transmission service, and when the number of free time slots changes from the first value to a second and greater value reverting the state of the system to the normal state wherein the continuous assignment of time slots is carried out.

2. In a time division synchronous satellite telecommunication system having a satellite transponder, a plurality of ground stations, a plurality of international transit centers each connected to one of the ground stations, speech signal communication between international transit centers taking place during time slots allocated from a plurality of time slots, each of the ground stations having a control processor, all of the control processors being in continuous connection with each other and continuously assigning time slots from a first subset of the plurality of time slots to at least some of the ground stations in response to their varying demands for transmission capacity and for assigning to each of the ground stations a fixed number of time slots from a second subset of the plurality of time slots regardless of the demands for transmission capacity, each of the ground stations of a subset of the ground stations having transmission apparatus which includes means detecting temporary interruptions in the receipt of speech signals from its associated international transit center which is assigned a time slot from the second subset and, during such temporary interruptions, transmitting during the related time slots such speech signals from its associated international transit center which are waiting for transmission service, apparatus for increasing the transmission capacity of such a system comprising, in at least one ground station a pulse generator which delivers on an output a pulse at periodical intervals, a first register which is constantly updated by the control processor of the ground station with information on the number of time slots free for continuous assignment, a first and a second AND gate, one input of each of which is connected to said output of said pulse generator in order that the AND gates may be opened by said pulse, a second register the content of which is a first integer and the output of which is connected to a second input of said first AND gate, a third register the content of which is a second integer and the output of which is connected to a second input of said second AND gate, a flip-flop register which has an output connected to a third input of said first and second AND gates and which, on a registered first binary number, opens said first AND gate and, on a registered second binary number, opens said second AND gate, and a comparison circuit the output of which is, via a third AND gate having a control input connected to said output of said pulse generator, connected to an input of said flip-flop register and a first input of which is connected to said first register to be fed with said information concerning the number of free time slots and a second input is connected to the respective outputs of said first and second AND gates to be fed wigh said first integer or with said second integer depending on whether said first binary number or second binary number is registered in said flip-flop register, the comparison circuit generating a comparison signal which, if the number on its said first input is less than the number on its second input, registers in said flip-flop register said second binary number and, if the number on its said first input is greater than or equal to the number on its second input, registers in said flip-flop register said first binary number, the binary numbers registered by said flip-flop register being continuously read out by the control processor of the ground station, said first binary number determining a program for the control processor corresponding to a normal state of the system wherein the continuous assignment of the time slots is carried out and said second binary number determining a program for the control processor corresponding to a frozen state of the system wherein the continuous assignment of time slots is interrupted and the ground stations of the subset of ground stations upon temporary interruptions in the receipt of speech signals from their associated international transit centers transmit during the associated time slots from the first as well as from the second subset such speech signals from their associated international transit centers which are waiting for transmission service.

* * * * *